3,639,425
PEROXYGEN COMPOUND
Robert C. P. Cubbon and John E. Braid, Luton, and Colin Hewlett, Harpenden, England, assignors to Laporte Chemicals Limited
No Drawing. Filed Apr. 3, 1968, Ser. No. 718,354
Claims priority, application Great Britain, Apr. 5, 1967, 15,543/67
Int. Cl. C07c 73/06; C07d 15/00
U.S. Cl. 260—340.2                   1 Claim

ABSTRACT OF THE DISCLOSURE

The invention provides hydroperoxides of β- or γ-keto-esters or β- or γ-keto-acids, advantageously, of the formula R.CO.(CH$_2$)$_x$.COOR$^1$ R and R$^1$ being radicals that maintain their identity in the presence of hydrogen peroxide and hydrogen ions.

---

The invention also provides compositions containing such hydroperoxides and an inert medium such as water and an organic solvent, processes for producing the hydroperoxides by reacting a β- or γ-keto-acid or ester with hydrogen peroxide, and processes for cross-linking unsaturated polyester resins by means of such hydroperoxides.

This invention relates to peroxygen compounds and, particularly to novel hydroperoxides.

The invention provides, as novel compounds, β-or γ-keto-ester or β- or γ-keto-acid hydroperoxides.

Such hydroperoxides are preferably of keto-esters or keto-acids having the general formula:

R—CO—(CH$_2$)$_x$COOR$^1$ where R and R$^1$ are radicals, which are the same or different, which will maintain their identity in the presence of aqueous hydrogen peroxide and of a source of less than 1.0 g. atoms of hydrogen ion per g. mole of keto-ester or keto-acid, x has a numerical value of 1 or 2.

The invention also provides hydroperoxides of keto-esters or keto-acids having the general formula RCO—(CR''$_2$)$_x$COOR$^1$ where R and R$^1$ are radicals which will maintain their identity in the presence of aqueous hydrogen peroxide and of a source of less than 1.0 g. atoms of hydrogen ion per g. mole of keto-acid or keto-ester, x has a numerical value of 1 or 2 and at least 1 occurrence of R'' is as an alkyl radical having 6 or less carbon atoms, the remaining occurrences of R'' being as hydrogen atoms.

In particular the present invention provides hydroperoxides of keto-esters or keto-acids having the above general formulae where R, or R$^1$ in the case of keto-esters, is an alkyl radical having six or less carbon atoms particularly a methyl or ethyl radical, or is a cycloalkyl radical particularly a cyclohexyl or cyclopentyl radical, and R'' is a hydrogen atom or is a methyl or ethyl radical. Preferably either all of the R'' radicals are hydrogen atoms or 1 is an alkyl radical and the remainder are hydrogen atoms.

The invention particularly provides hydroperoxides of
acetoacetic acid
ethyl aceto-acetate
ethyl 2 methyl aceto-acetate
laevulic acid
ethyl laevulate.

We use the term "peroxide" herein to denote the structure

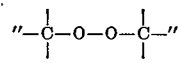

and the term "peroxy" or "peroxygen" to include both the above structure and hydroperoxy groups.

Peroxides of β- or γ-keto-acids or β- or γ-keto-esters may be produced by reacting hydrogen peroxide with the keto-acid or keto-ester in a strongly acidic aqueous medium. Such compounds are thought to be cyclic diperoxides having no hydroperoxidic groups. An example of a strongly acidic medium is one which contains 2 or 3 g. atoms of hydrogen ion per g. mole of keto-esters or keto-acid.

The present invention provides a process for the production, essentially, of hydroperoxides of β- or γ-keto-acids or β- or γ-keto-esters by forming, in an inert medium, a reaction mixture which consists of one or more β- or γ-keto-acids and aqueous hydrogen peroxide or which consists of one or more such keto-acids or one or more β- or γ- keto-esters, aqueous hydrogen peroxide and an added source of hydrogen ion in a quantity which is less than that which causes the formation of, solely, peroxide groups, and maintaining the reaction mixture until at least some hydrogen peroxide is consumed.

Preferably the hydroperoxides produced are of keto-esters or keto-acids having the general formula:

RCO(CR''$_2$)$_x$COOR$^1$ or RCO(CH$_2$)$_x$COOR$^1$ where R, R$^1$, R'' and x have the values previously defined.

Depending on the identity of the starting keto-compound the reaction with aqueous hydrogen peroxide to form a hydroperoxide may vary in its sensitivity to the presence of an added source of hydrogen ion.

The hydroperoxides produced by this invention, particularly cyclic compounds having a hydroperoxy and peroxy group, react with a t-alkanol and sulphuric acid to form t-alkyl peroxides, e.g. t-butyl and t-amyl peroxides.

In general the reaction between β- or γ-keto-esters and aqueous hydrogen peroxide will require at least some added source of hydrogen ion as catalyst. A quantity at least 0.0001 gram atom of added hydrogen ion is suitable. Hydroperoxides of such keto-esters cease to appear in the reaction product when a strongly acidic medium is used and for this reason we prefer to maintain the concentration of added hydrogen ion at less than 1 g. atom per g. mole of keto-ester. The upper limit of added hydrogen ion for the production of hydroperoxides may vary somewhat according to the identity of the keto-ester used as starting material and the exact upper limit of quantity of added hydrogen ion may be determined for any particular keto-ester by experiment the presence of hydroperoxy groups being detectable by known means.

The reaction between β- or γ-keto-acids and aqueous hydrogen peroxide appears to proceed more readily and the presence of an added source of hydrogen ion is not necessary as catalyst.

It is preferable, however, to use at least some added hydrogen ion, and it is also preferable to use not more than 1.0 g. atom of hydrogen ion per g. mole of keto-acid.

Again the exact upper limit in the case of any particular keto-acid may be determined by experiment.

The present invention also includes processes for the production of hydroperoxides of β- or γ-keto-acids wherein precursors of said acids, which form said acids in contact with hydrogen peroxide, are used. Diketene is such a precursor. It is thought to give rise to peracetoacetic acid in contact with aqueous hydrogen peroxide, the acid then forming a cyclic hydroxy peroxide which reacts with further hydrogen peroxide to form a cyclic hydroperoxy peroxide. The present invention therefore includes the production of a hydroperoxide of a keto-acid wherein the reaction mixture is formed from one comprising diketene and aqueous hydrogen peroxide.

The inert medium used in the present processes may be water, which may, partly or wholly, be provided by the aqueous hydrogen peroxide, or may comprise an organic solvent medium, for example, a hydrophilic organic solvent for the keto-ester or keto-acid and corresponding hydroperoxide such as dipropylene or hexylene glycol, or for example, a hydrophobic organic solvent for the keto-ester or keto-acid and corresponding hydroperoxide such as dimethyl or diethyl phthalate. Methylene chloride or one or more trialkyl phosphates are suitable solvents.

As stated above, the reaction of aqueous hydrogen peroxide with a keto-ester proceeds less readily than with a keto-acid with the consequent need to catalyse the reaction by the means of an added source of hydrogen ion. When relatively small amounts of such added catalyst are used a dihydroperoxide tends to form and when relatively larger amounts of such added catalyst are used a product having both hydroperoxide and peroxidic properties tends to form.

In the case of hydroperoxides of keto-esters it is thus possible to control the type of hydroperoxide product which is obtained by controlling the quantity of added source of hydrogen ion used. The point at which the dihydroperoxide product ceases to form varies according to the identity of the keto-ester used but can be readily determined by experiment. In the case of hydroperoxides of ethyl acetoacetate a product exhibiting, solely, hydroperoxidic properties is obtained when less than 0.01 g. atom of added hydrogen ion per gram mole of ethyl acetoacetate is used.

The two types of hydroperoxides are both useful although they do have different effects in the gelation of unsaturated polyester resins. Such hydroperoxides and the process for preparing them are provided by the present invention. Some of the hydroperoxides provided herein may tend to alter in structure in storage. Such a tendency may be retarded by using known peroxide stabilisers.

The source of added hydrogen ion used in the invention is preferably a mineral acid, particularly a strong mineral acid such as sulphuric acid or hydrochloric acid. The acid may be introduced into the reaction medium while absorbed on an inert carrier. Alternatively a solid material having a content of hydrogen ion may be used for example a clay material such as that known by the trade name "Fulmont XX" or "Fulcat 14" or a suitable ion exchange resin. The aqueous hydrogen peroxide used for the reaction will normally also contain some hydrogen ion.

The acid may be introduced into a reaction mixture in any concentration which will not cause charring and, for example, it is desirable to introduce sulphuric acid into the reaction mixture as aqueous acid having a concentration below 50% w./w. The acid is preferably introduced as an aqueous solution of from 5 to 20% w./w.

The aqueous hydrogen peroxide used in this invention is advantageously of at least 65% w./w. and preferably at least 80% w./w. for instance, desirably 85% w./w., concentration except where it is desired to produce a novel composition, according to the invention, based on water. The hydrogen peroxide may be that produced by a cyclic process involving alternate reduction and oxidation of an organic intermediate for example a substituted anthraquinone. The aqueous hydrogen peroxide is preferably used in a molar ratio of from 1:1 to 3:1 based on the amount of ketone used.

Adjustment of the quantities of inert medium present during the reaction and of the proportions of reactants themselves will result in variation in the concentration of the hydroperoxide product. The concentration of the product can, for instance, be increased by raising the concentration of aqueous hydrogen peroxide used, reducing the quantity of acid catalyst used or using a solid catalyst which can be removed easily after the reaction, and carrying out the reaction either in the resulting very small quantity of inert aqueous medium or, alternatively, in a medium in which the hydroperoxide product is insoluble for example in a suitable organic solvent medium. Residual acid and unreacted hydrogen peroxide may be removed by washing the product with saturated ammonium sulphate solution where, for example, the acid used is sulphuric acid. Residual water may then be further reduced by contacting the product with anhydrous sodium sulphate or similar material. The resulting hydroperoxide product may have a purity as high as 90% or more by weight. Thus the invention provides for the production, in a substantially pure state, or novel hydroperoxides.

In practice the process of our invention is suitably carried out by mixing the acid or ester, the source of hydrogen ion if used, and the inert medium, and by adding to the mixture, dropwise, the aqueous hydrogen peroxide. The mixture is preferably maintained in agitation during the addition of the hydrogen peroxide.

In some embodiments of the invention the reaction with the hydrogen peroxide may not have gone to completion immediately after the addition of the hydrogen peroxide has been completed. Where the reaction is being carried out in an aqueous medium or in an organic medium which is a hydrophilic solvent for the novel hydroperoxide formed the reaction mixture and the medium are advantageously allowed to stand for a period of time which varies with the reaction conditions used but which may, broadly, vary from 15 minutes to 16 hours. Where the reaction is being carried out in a hydrophobic medium or in a medium in which the novel peroxide formed is not soluble the reaction mixture and medium are, desirably stirred for the requisite period of time. The reaction is preferably carried out at from 10° C. to 30° C.

The present invention particularly provides a process for the preparation of a composition containing ethyl acetoacetate hydroperoxide or ethyl 2 methyl acetoacetate hydroperoxide which comprises forming a reaction mixture consisting of ethyl acetoacetate or ethyl 2 methyl acetoacetate, from 1 to 3 moles of hydrogen peroxide (as an aqueous solution of at least 80% concentration) per mole of ethyl acetoacetate, and sufficient strong mineral acid to provide from 0.0001 to 0.01 gram atom of hydrogen ion per gram mole of ketone, in an inert medium comprising a hydrophobic organic solvent such as dimethyl phthalate in a quantity sufficient to give a hydroperoxidic composition of the concentration required and maintaining the reaction mixture in agitation at a temperature of from 10° C. to 30° C. until the reaction has substantially ceased.

The novel compounds and compositions of this invention, most particularly those obtained when less than 0.01 g. atom of hydrogen ion per gram mole of ester is used to catalyse the reaction, are most useful in curing unsaturated resins. This invention therefore also provides a process for curing unsaturated resins, particularly curing of unsaturated polyester resins catalysed by cobalt compounds, in which such novel compounds or compositions are used and also articles of manufacture containing resins so cured. Particularly useful compositions for such use are those produced by the present invention in an inert environment comprising dimethyl phthalate. The resulting dimethyl phthalate hydroperoxide solution may be used directly in the gelation of suitable resins.

The invention will now be illustrated by means of the following examples.

EXAMPLE 1

5 g. ethyl acetoacetate and 0.01 ml. sulphuric acid (5% v./v. were stirred in a beaker. 3.05 g. hydrogen peroxide (86% w./w.) was added over a period of 10 minutes. External cooling was applied to prevent the temperature from rising above 25° C. The reaction mixture was stirred at ambient temperature for 16 hours and washed three times with saturated ammonium sulphate solution (⅛ vol.), and then dried with anhydrous sodium sulphate. The resulting solution comprising almost pure ethyl acetoacetate hydroperoxide, gave the analysis (percent): Av. $O_2$, 10.8; $H_2O_2$, 0.0.

The product corresponded to that identified as Species II in Example 2 and its infra red spectrum in methylene chloride shows ester carbonyl absorbtion at 1730 cm.$^{-1}$.

The hydroperoxidic nature of the product was demonstrated by the formation of a salt with triethylene diamine. (The ability of hydroperoxides to form salts with triethylene diamine and other amines is reported in U.S. Pat. No. 3,236,850.)

The method employed was as follows:

2.24 g. triethylene diamine was dissolved in 30 ml. diethyl ether. 7.84 g. of the product was then added slowly with stirring. The stirred reaction mixture was then cooled to −40° C. for 20 minutes. A white solid precipitate was obtained and was filtered off. The crude product was recrystallised twice from ethanol/ether to give white crystals M.P. 75–76° C.

Analysis of this salt gives the following data (percent): Av. $O_2$, 10.8; C, 43.5; H, 8.0; N, 9.0.

The data which would, in theory, be obtained from compound I below is (percent): Av. $O_2$, 10.95; C, 49.3; H, 8.25; N, 9.59.

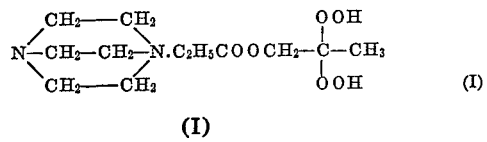

(I)

The analysis therefore suggests that the hydroperoxide produced had the structure

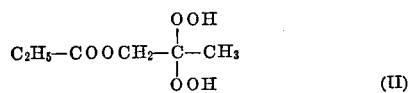

(II)

EXAMPLE 2

Ethylaceto-acetate (5.0 g.) was dissolved in dimethyl phthalate (5.0 g.) and the solution was cooled to 0° C. The amounts of acid shown in Table I, for each experiment, was added. Hydrogen peroxide was then added, over 15 minutes with stirring in the quantity shown in Table I for each experiment. The reaction mixture was then allowed to stand overnight at room temperature.

The product of each experiment was analysed, after separation of the aqueous layer if any, washing with saturated ammonium sulphate solution and drying over sodium sulphate, by thin layer chromatography. Samples were developed with ether-methylene chloride (1:4) and detected with a hydrogen iodide/acetic acid spray.

The results were as follows:

$H_2O_2$ RF=0.20–0.30
Species II RF=0.31–0.44
Species III RF=0.57–0.63

EXAMPLE 3

50 g. ethyl acetoacetate, 50 g. dimethyl phthalate and 0.1 ml. sulphuric acid (5% v./v.) were stirred in a beaker. 29.9 g. hydrogen peroxide (88% w./w.) was then added over 10 minutes, the temperature being maintained below 30° C. After 2 hours reaction time, the mixture was cooled to 0° C. and 13 ml. sulphuric acid (50% w./w.) was added. The reaction mixture was allowed to warm up slowly and stirred at ambient temperature overnight. The lower layer was discarded and the upper organic layer was washed 4 times with saturated ammonium sulphate solution. After drying over sodium sulphate 88.1 g. of product was obtained with the following analysis (percent): Av. $O_2$, 9.8.

The product contained only species III (RF 0.57–0.63) as identified in Example 2.

Structure of Species III

The following evidence indicates that species III contains a hydroperoxide group:
 (i) Reaction takes place with lead tetra-acetate;
 (ii) A salt is formed with triethylene diamine;
 (iii) The activity in the cobalt catalysed curing of unsaturated polyesters.

The infrared spectrum of species III in methylene chloride shows a strong absorption at 1815 cm.$^{-1}$. This large shift in the carbonyl absorption of species III from that of Species II, indicates that a major structural change takes place, and might be accounted for by a cyclisation:

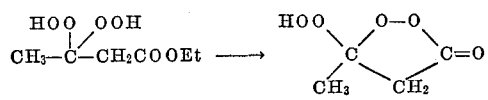

A peroxy lactone has been prepared which shows a carbonyl absorption at 1810 cm.$^{-1}$.

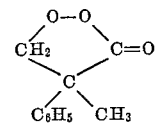

F. D. Greene, W. Adam and G. A. Knudsen, J. Org. Chem. 31, 2087 (1966). Thus, the proposed structure could account for the hydroperoxidic properties and the strong I.R. absorption at 1815 cm.$^{-1}$. It is therefore believed that Species III is

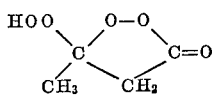

TABLE I

| Experiment | Hydrogen peroxide (g. 86% soln.) | H+ catalyst provided by (ml.) $H_2SO_4$ | = g. atoms H+/g. mole Ea-acetate | Species present | Av. $O_2$ content (percent) | $H_2O_2$ content (percent) |
|---|---|---|---|---|---|---|
| 1 | 6.1 | | | | No reaction | |
| 2 | 6.1 | 0.013 (5%) | 0.00035 | II | 9.12 | 0.8 |
| 3 | 6.1 | 0.026 (5%) | 0.0007 | II | 9.43 | 0.6 |
| 4 | 6.1 | 0.026 (50%) | 0.007 | II | 9.65 | 0.3 |
| 5 | 3.05 | 0.26 (50%) | 0.07 | II+III | 9.65 | 0.2 |
| 6 | 6.1 | 0.26 (50%) | 0.07 | II+III | 9.9 | 0.3 |
| 7 | 6.1 | 1.3 (50%) | 0.35 | III | 10.55 | 0.4 |
| 8 | 3.05 | 2.6 (50%) | 0.7 | III | 9.85 | 0.1 |
| 9 | 6.1 | 2.6 (50%) | 0.7 | III | 10.1 | 0.3 |

EXAMPLE 4

10 g. ethyl acetoacetate, 10 g. dimethyl phthalate and 0.02 ml. sulphuric acid (5% v./v. aqueous solution) which is equivalent to 0.00027 g. atoms of hydrogen ion per gram-mole of ethyl actoacetate were stirred in a beaker. 6.1 g. hydrogen peroxide (86%) w./w. was added dropwise over a period of 15 minutes. The reaction mixture was cooled externally so that the temperature did not exceed 25° C. The reaction mixture was stirred at ambient temperature for a further 16 hours, washed with saturated ammonium sulphate solution (⅛th. vol.) and dried over anhydrous sodium sulphate. The resulting solution in dimethyl phthalate gave the following analysis (percent): Av.$O_2$, 6.8; $H_2O_2$, 3.3.

Analysis by thin layer chromatography showed that the solution contained one hydroperoxidic species.

This hydroperoxide solution was very active in the cobalt octoate catalysed curing of the unsaturated polyester resin Crystic 189.

EXAMPLE 5

14.4 g. ethyl laevulate, 8.7 g. dimethyl phthalate and 0.015 ml. sulphuric acid (5% v./v.) which is equivalent to 0.001 g. atom of hydrogen ion per gram mole of ethyl laevulate were stirred in a beaker, 8.6 g. hydrogen peroxide (86% w./w.) was added dropwise over a period of 15 minutes. External cooling was applied to prevent the temperature exceeding 25° C. The reaction mixture was stirred for a further 16 hours at ambient temperature, washed with saturated ammonium sulphate solution (⅛th. vol.) and dried over anhydrous sodium sulphate. The resulting solution gave the following analysis (percent) Av. $O_2$, 8.8; $H_2O_2$, 0.3.

This ethyl laevulate hydroperoxide solution was effective in the cobalt naphthenate catalysed curing of unsaturated polyester resins.

EXAMPLE 6

10 g. ethyl laevulate and 0.02 ml. sulphuric acid (5% v./v.) were stirred together in a beaker. 5.46 g. hydrogen peroxide (86%) was then added slowly over a period of ten minutes, while the reaction vessel was cooled to prevent the temperature rising above 20° C. The reaction mixture was stirred at ambient temperature for 16 hours, washed twice with saturated ammonium sulphate solution and dried over anhydrous sodium sulphate. The substantially pure ethyl laevulate hydroperoxide obtained gave the following analysis (percent): Av. $O_2$, 13.0; $H_2O_2$, 0.2.

The ethyl laevulate peroxide concentrate reacted with triethylene diamine in ether to give a hygroscopic salt. This reaction indicates that the major species in the ethyl laevulate peroxide prepared under the above conditions was in fact a hydroperoxide.

EXAMPLE 7

10 g. ethyl acetoacetate, 20 g. dimethyl phthalate and 0.02 ml. sulphuric acid (5% v./v.) were stirred in a beaker. 6.1 g. hydrogen peroxide (86% w./w.) was then added slowly over a period of 15 minutes. The reaction procedure and work up was carried out as described in Example 1.

The resulting solution gave the following analysis (percent): Av. $O_2$, 3.5; $H_2O_2$, 0.6.

The curing properties of this hydroperoxide solution are compared with a commercial methyl ethyl ketone peroxide (MEKP RGS) in Table II. The results show that ethyl aceto-acetate hydroperoxide containing only 3.5% of available oxygen is at least as active as the MEKP solution having an available oxygen content of 13%.

TABLE II

Gelation of Crystic 189 Resin using 1% Cobalt accelerator solution (1% of cobalt, naphthenate in white spirit/styrene)

| Wt. of peroxygen compound added to resin | Ethyl aceto-acetate peroxide Av. $O_2$, 3.5% | | | MEKP RGS Av. $O_2$, 13% | | |
|---|---|---|---|---|---|---|
| | tg | tc | Tm,° C. | tg | tc | Tm,° C. |
| 1 | 28 | 52 | 118 | 30 | 53 | 140 |
| 2 | 14 | 24 | 124 | 9.5 | 20 | 140 |
| 3 | 9 | 18 | 124 | 7.5 | 19 | 154 |
| 4 | 7.5 | 16 | 131 | 7 | 17 | 152 |

NOTE.—tg=time to gel (min.); tc=time to exotherm maximum (min.); Tm,° C.=maximum temperature.

TABLE III

Comparison of the hazard properties of the ethyl aceto-acetate hydroperoxide solution with MEKP RGS

| Test | Ethyl aceto-acetate hydroperoxide Av. $O_2$, 3.5% | MEKP RGS Av. $O_2$, 13.0% |
|---|---|---|
| Ignition time (disc test). | 230 sec | 5-10 sec. |
| Pressure-time test | Did not reach 300 p.s.i. | 70 millisec. |
| Adiabatic compression sensitivity. | No decomposition at 140 kg. cm. | Decomposition at 10-15 kg. cm. |

The ignition time test was carried out by placing 2 ml. of the hydroperoxide containing solution on a sintered glass disc (40 mm. diameter, 3 mm. thick, No. 0). A microjet gas burner, adjusted so that it will ignite 2 ml. of technically pure dipropylene glycol on a similar disc after 130 seconds, was played on the disc. The ignition time is taken as that required for the solution to ignite and for the flame to spread over about half of the surface of the disc.

The pressure/time test was performed by confining a sample of the hydroperoxide solution within a closed space having approximately nine times its volume. The sample was then ignited and the time taken for the pressure inside the space to rise from 100 p.s.i. to 300 p.s.i. was measured.

The adiabatic compression sensitivity test was carried out by confining a sample of the hydroperoxide with an equal volume of air in a closed space and subjecting the sample and air to adiabatic compression. The energy required to initiate combustion of the sample was measured.

EXAMPLE 8

14.4 g. ethyl 2-methyl acetoacetate 12.9 g. tri-ethyl phosphate and 0.004 ml. sulphuric acid (5% v./v.) were stirred in a beaker, and 7.66 g. hydrogen peroxide (86% w./w.) was added dropwise over 10 minutes. External cooling was applied to maintain the temperature at 20° C. After 1 hour the reaction mixture was cooled to 0° C., and 3.38 ml. sulphuric acid (50% v./v.) was added. The reaction mixture was maintained at 0° C. for a further 4 hours, and then allowed to warm up to ambient temperature and stirred overnight. The resulting peroxide solution was washed with saturated ammonium sulphate solution and dried over anhydrous sodium sulphate (percent): Av. $O_2$, 8.91; $H_2O_2$, 1.25.

Under the conditions described above cyclisation occurred yielding 5 - hydroperoxy-4,5-dimethyl-1,2-dioxolan-3-one:

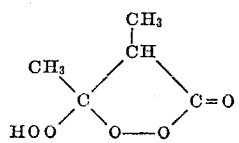

This hydroperoxide was found to be active in the cobalt catalysed curing of crystic 189 resin (1% cobalt accelerator).

| Wt. of peroxide added | $\begin{array}{c}CH_3\\ \diagdown\\ CH_3-C\\ \diagup\\ CH_3\end{array}\begin{array}{c}CH_3\\ |\\ CH\\ \diagdown\\ O-O\end{array}\begin{array}{c}\\ \\ C=O\\ \diagup\\ \end{array}$ | | | $\begin{array}{c}CH_3\\ \diagdown\\ C\\ \diagup\\ HOO\end{array}\begin{array}{c}CH_2\\ \diagdown\\ \diagdown\\ O-O\end{array}\begin{array}{c}\\ \\ C=O\\ \diagup\\ \end{array}$ | | |
|---|---|---|---|---|---|---|
| | 6% Av. O₂ soln. | | | 6% Av. O₂ soln. | | |
| | tg | tc | Tm,° C. | tg | tc | Tm,° C. |
| 1 | 29 | 41 | 125 | 58 | 87 | 130 |
| 2 | 12 | 18 | 130 | 15 | 24 | 129 |
| 3 | 7 | 12 | 115 | 7 | 11 | 127 |
| 4 | 5 | 10 | 128 | 5 | 9 | 134 |

NOTE.—tg=gel time (min.); tc=time to exotherm maximum; Tm,°C.= exotherm maximum temperature.

EXAMPLE 9

4-oxovaleric acid (levulinic acid) (11.61 g., 0.1 mole) was dissolved in methylene chloride (150 ml.), sulphuric acid (5%, 0.03 ml.) added and the mixture cooled to 0° C. Hydrogen peroxide (87.6%) (7.66 g. 0.2 mole) was added slowly at 0° C., the reaction mixture was then allowed to warm to room temperature and stirred overnight. The methylene chloride solution was washed with saturated ammonium sulphate solution, dried (Na₂SO₄), and evaporated to give a white solid. The product was recrystallised from methylene chloride at −30° C. to give a compound identified as γ-hydroperoxy-γ-valerolactone.

EXAMPLE 10

Acetoacetic acid (3.0 g. 0.03 mole) was dissolved in methylene chloride (20 ml.), sulphuric acid (5%, 0.005 ml.) added, and hydrogen peroxide (88%) (2.28 g. 0.06 mole) added dropwise with the reaction mixture maintained at 20° C. After stirring overnight the methylene chloride solution was washed with saturated ammonium sulphate solution and dried (Na₂SO₄). T.L.C. and infra red spectroscopy identified the single peroxidic species present as 5-hydroperoxy-5-methyl-1,2-dioxolan-3-one.

EXAMPLE 11

Gelation of crystic 189 resin using EAAP Species III as prepared in Example III in DMP/TET (Av. O₂=4.0%) and 1% cobalt accelerator

| Percent addition | tg | tc | T., max. |
|---|---|---|---|
| 1 | >120 | | |
| 2 | 65 | 82 | 122 |
| 3 | 30 | 40 | 122 |
| 4 | 21 | 30 | 137 |

EXAMPLE 12

Diketen (2.1 g., 0.025 mole) was dissolved in methylene chloride (50 ml.) and sulphuric acid (50% 0.1 ml.) added. Hydrogen peroxide (87%) (1.96 g., 0.05 mole) was added dropwise with the temperature maintained at 0° C. and the reaction mixture was then allowed to warm to room temperature and stirred overnight. The methylene chloride solution was then washed with ammonium sulphate solution (3× 50 ml.) and dried (Na₂SO₄). T.L.C. and infra red spectroscopy identified the single peroxidic species present as 5-hydroperoxy-5-methyl-1,2-dioxolan-3-one.

What is claimed is:

1. A compound having the formula:

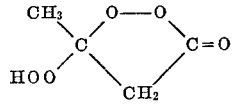

References Cited

UNITED STATES PATENTS

| | | | |
|---|---|---|---|
| 2,455,569 | 12/1948 | Dickey | 260—610 |
| 2,568,682 | 9/1951 | Levesque | 260—610 |
| 3,003,000 | 10/1961 | Milas | 260—610 |
| 3,047,406 | 7/1962 | Ferrari et al. | 260—610 X |
| 3,308,163 | 3/1967 | McKellin | 260—610 |

FOREIGN PATENTS 640,192  7/1950  Great Britain.

NORMA S. MILESTONE, Primary Examiner

U.S. Cl. X.R.

260—610 D, 478, 484 R, 343.6, 78.4 E